Sept. 16, 1930.   F. J. HINDERLITER   1,776,025
CASING RIPPER
Filed Oct. 19, 1927   2 Sheets-Sheet 1
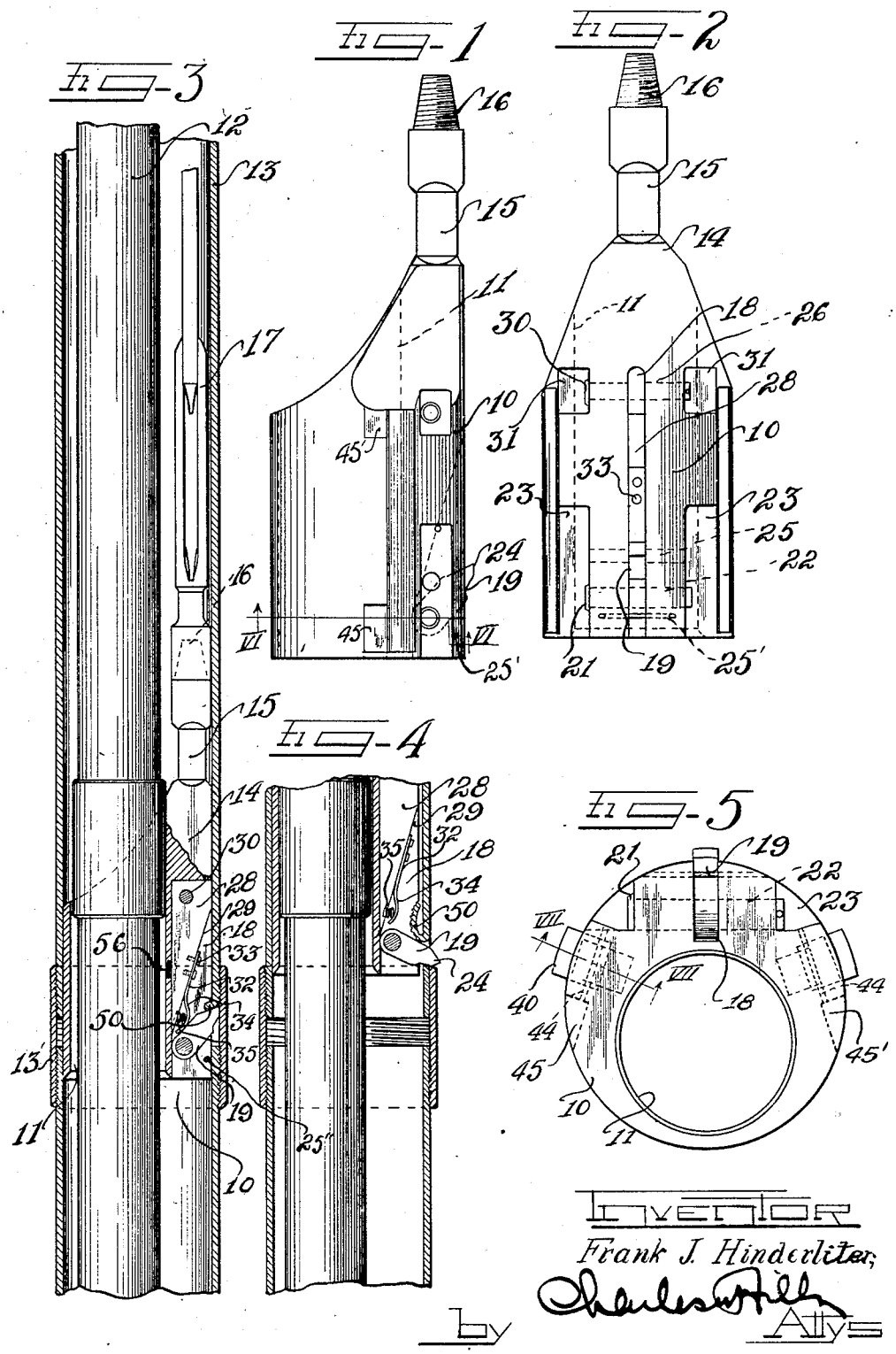
Inventor
Frank J. Hinderliter
by Charles... Attys

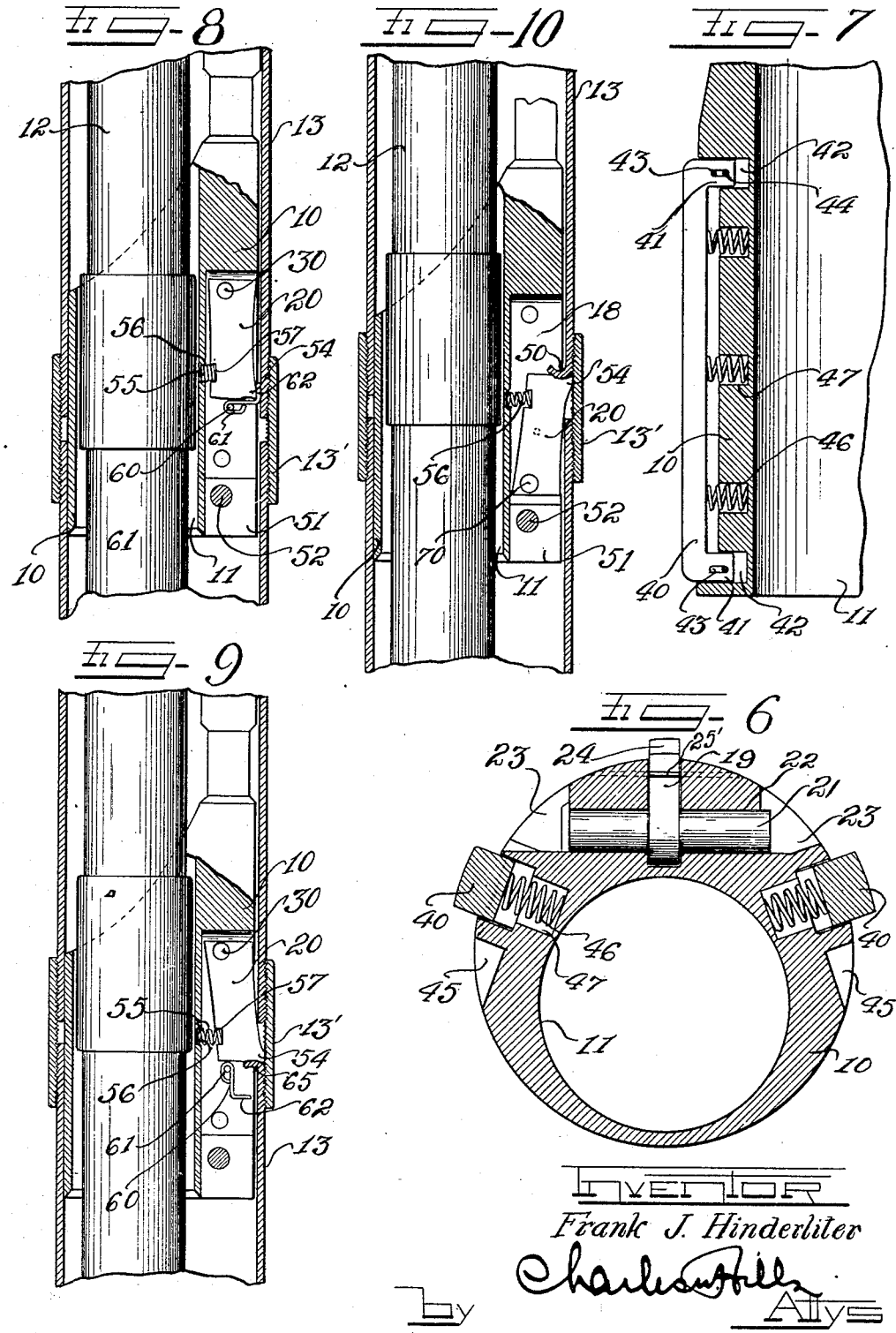

Patented Sept. 16, 1930

1,776,025

UNITED STATES PATENT OFFICE

FRANK J. HINDERLITER, OF TULSA, OKLAHOMA

CASING RIPPER

Application filed October 19, 1927. Serial No. 227,198.

My invention relates in general to a casing ripper, and more particularly to an eccentric casing ripper adapted to be lowered into a well casing without disturbing the piping and tools therein, and then operated to cut or rip the lower end of a casing sleeve out of a coupling or collar connecting the adjacent ends of a pair of such sleeves.

An object of my invention is the provision of an improved casing ripper adapted to separate the sleeves of a deep well casing with facility without the necessity of removing the piping and tools in said casing.

Another object of the invention is the provision of a casing ripper including a body having an eccentrically disposed cutter or ripper knife and a plurality of friction plates adapted to engage the inner surface of the casing to hold the body and the lower member of a fishing jar up in the well hole so that the upper fishing jar can be operated.

A further object of the invention resides in the provision of a deep well casing ripper of simple and inexpensive construction including an eccentrically disposed ripping tool or cutter and adapted to be lowered with facility into a given position in the well casing, so as to enable the adjacent sleeves of said casing to be separated in a comparatively short time.

A still further object of the invention is the provision of a ripper including a coupling portion set over to one side of the piping in the casing, a body member connected to the coupling portion having an eccentrically disposed hole through which the piping in the casing is adapted to pass and an eccentrically disposed ripping tool mounted in the body member below the joint portion, the joint portion being so arranged that it will allow the tool to be lowered clear down to the bottom of the casing over the piping and tool in the casing.

Other objects and advantages of my invention will more fully appear from the following detailed description taken in connection with the accompanying drawings, which illustrate several embodiments thereof and in which:

Figure 1 is an elevation of the tool of my invention;

Figure 2 is a side elevation of the tool shown in Figure 1;

Figure 3 is a fragmentary view partly in section and elevation illustrating the position of the tool when it is lowered into a well casing;

Figure 4 is a fragmentary view partly in section and elevation similar to the lower part of Figure 3 and drawn to an enlarged scale showing the position of the cutting knife after it has ripped clear through the casing wall;

Figure 5 is a bottom view of the tool shown in Figure 2;

Figure 6 is a cross-sectional view taken on the line VI—VI of Figure 1 looking upwardly;

Figure 7 is a fragmentary sectional view taken on substantially the line VII—VII of Figure 5 looking in the direction indicated by the arrows and showing the mounting for the frictional plate adapted to engage the inner surface of the casing;

Figure 8 is a fragmentary view partly in section and elevation showing the tool provided with a cutter rather than a knife such as that shown in Figure 1;

Figure 9 is a view similar to Figure 8 illustrating the manner in which the cutter rips the casing from the coupling, and Figure 10 is a fragmentary sectional view partly in elevation similar to Figure 9 showing the cutter in an inverted position and illustrating the manner in which the casing is ripped from the coupling.

In the drawings:

Like reference characters designate similar parts throughout the several views.

The device, as best shown in Figure 1, comprises a body 10 having an eccentrically disposed opening 11 (Figure 5) through which the piping or string of pipes 12 in the casing 13 is adapted to pass. The body 10 is provided with an upwardly extending eccentric portion 14, the upper end of which has formed integral with it a pin 15. This pin has a threaded portion 16 adapted to be coupled to suitable lowering means such as the jar 17 shown in Figure 3 and a string of pipes (not shown). This jar 17 is of conventional construction and is adapted to be used in the operation of the ripper, as will be more fully explained hereinafter.

The body 10 (Figures 2 and 5) has an elongated vertical slot 18 in which is disposed a tool which may take the form of the cutter or ripper knife 19 shown in Figures 1 to 6, inclusive, or which may take the form of the cutter blade 20 shown in Figures 8 to 10, inclusive. The blade 20 will be more fully described in connection with Figures 8, 9 and 10.

The knife 19 is pivotally mounted upon a pin 21 which extends through an opening 22 in the body 10. This opening 22 is disposed in a horizontal plane and intersects the slot 18. It will be observed from Figures 2 and 5 that the body has two recessed portions 23 which are provided to enable the ends of the pin 21 to be within the cross-sectional dimensions of the body 10. The ripper knife or cutter 19 includes a point 24 which projects beyond the body 10. Attention is directed to the fact that the slot 18 is also intersected by two other horizontal openings 25 and 26 disposed above and parallel to opening 22. Positioned below the opening 22 is a small opening 25' adapted to receive a nail or pin 25'', which is used to limit the downward movement of the knife 19 during the time it is being lowered in the well casing. This nail prevents the knife from turning upside down in the event it comes into a cavity in the casing 13. Obviously, upon the beginning of the upward or shearing stroke of the blade, this nail will be sheared by the knife 19.

Mounted in the slot 18 (Figures 3 and 4) is a block 28 including a slanting surface 29. The block is held in place by means of a pin 30 extending through the upper end thereof and through horizontal opening 26 (Figure 2). It will be noted that the body 10 is provided with two recessed portions 31 for accommodating the ends of the pin 30. Mounted upon the slanting surface 29 of block 28 is a leaf spring 32 suitably secured thereto by screws 33. This leaf spring has its lower end bent outwardly, as indicated at 34. Positioned between the bent end 34 of leaf spring 32 and the slanting surface 29 of block 28 is a spring 35 which tends to at all times urge this end of the spring away from the block. Obviously when the knife 19 is in its upper position (Figures 1 and 3) it will be urged outwardly by the spring 35 through the bent end 34 of the leaf spring 32 which is in engagement therewith.

In order to hold the body 10 of the device up in the casing, I provide the body with a pair of oppositely disposed friction plates 40. Since these plates are identical in construction, it is thought that a description of one will suffice for both. Each plate 40 includes lateral projections 41 extending into slots 42 in the body 10. Each projection 41 has an elongated slot 43 through which extends a pin 44 (Figure 7). In Figure 5 it will be observed that the body 10 is provided with right angular recessed portions 45 and 45' positioned adjacent the friction plates 40. These recessed portions permit of the passing of the pins through the elongated slots 43 in each of the friction plates 40. The friction plate is at all times urged outwardly by means of a plurality of springs 46 positioned in apertures 47 formed in the body 10. These springs engage the inner surface of the friction plate and tend to at all times urge the plate away from the body 10. Obviously, when the device is lowered into the well casing 13, these friction plates 40 will be urged into engagement with the inner surface of the casing.

The operation of my novel ripping device is briefly as follows:

The device is fitted over the string of pipes 12 and lowered into the casing 13 by means of the jar 17 and the rod or piping connected thereto. This device is lowered until it reaches the casing coupling 13' from which the upper section of casing is to be ripped. It will be evident that the friction plates 40 will function to hold the device in the position to which it is lowered. In other words, during the downward movement of the upper jar member, this device will be held in place by the frictional engagement of the plates upon the casing 13 (Figure 3).

During the lowering of the body 10, the point 24 of the knife 19 rides on the inner surface of the casing 13. That is to say, the spring 35 functions to urge the knife into engagement with the wall of the casing. When the point 24 of this knife reaches the opening between the adjacent ends of the casing sections connected by coupling 13', it obviously will be forced into this opening. Thereafter by operating the jar 17, it is possible to rip and cut the upper casing section from the coupling 13', as indicated at 50 in Figures 3 and 4. This ripping action is the same as that disclosed in my Patent No. 1,433,722, issued October 31st, 1922. Of course, it is to be understood that the ripping of the upper casing section from the coupling 13' takes place without the necessity of disturbing or removing the piping 12. It is to be remembered that during this ripping action, the friction plates 40 are urged outwardly by the coil springs 46 which are stiff enough to hold the body 10 of the ripper and the lower member of the fishing jar 17 up in the well casing 13 so that it is possible to get the full effect of the action of the fishing jar in driving the blade 19 upwardly.

In Figures 8 and 9 I have shown the body 10 as being provided with a cutter 20 instead of the knife blade 19. This cutter 20 is mounted in the upper part of the slot 18 and is pivotally carried upon the pin 30 extending through the upper horizontal opening 26. It will be evident that when the cutter blade 20 is used, it is not necessary to employ a block such as the block 28 shown in Figure 3. However, it is desirable to close off the lower part of the slot 18 by means of a closure member 51 held in place by a pin 52 extending through the horizontal opening 22.

At this time attention is directed to the fact that the cutter blade 20 is adapted to rip the lower section of casing 13 from the coupling 13′. That is to say, the cutter blade 20 is operated by a downward movement of the jar 17.

The cutter blade 20 includes a lateral point or cutting edge 54 adapted to perform the cutting operation. This point 54 is at all times urged toward the casing by means of a small compression spring 55 mounted in an opening 56 in the body 10 and extending into an opening 57 in the cutter blade 20.

When the device shown in Figure 8 is being lowered, it will, of course, be evident that it is necessary to hold the cutting edge 54 out of engagement with the casing wall. This is accomplished by means of a little right angular tripping element 60. This element is mounted upon a small pin 61 carried by body 10. The vertical leg 62 of this tripping element is adapted to normally extend over the cutting edge 54, whereby it will be held within the slot 18.

The operation of this form of my invention is briefly as follows:

The device is lowered into the casing 13 until the vertical leg 62 of the tripping element 60 comes into a position opposite the opening between the ends of the casing sections in coupling 13′. Then, by a slight upward movement of the jar connected to the body 10, it is possible to trip the element 60 off the edge 54 of the cutter 20 and it will gravitate to the position shown in Figure 9. That is to say, by this upward pull upon the body 10, the vertical leg 62 engages in the opening between the sections of casing in coupling 13′ and is pulled off the cutting edge 54. Thereafter by jarring the cutter blade 20 downwardly it is possible to rip the lower casing section from the coupling 13′, as indicated at 65 in Figure 9. Furthermore, inasmuch as the cutting edge 54 at all times rests upon the upper edge of the lower casing section during the ripping action, it is not necessary in this form of the invention to employ friction plates 40. That is to say, in this construction the use of friction plates is optional.

In Figure 10 I have illustrated the blade 20 as being mounted upside down in the slot 18. When in this position, the cutting edge 54 of the blade 20 is adapted to rip the upper casing section from the coupling 13′.

This upside down blade 20 is held in place in the slot 18 by means of a pin 70 extending through the horizontal opening 25. The blade is at all times urged outwardly by means of the spring 55.

The operation of this form of the invention is briefly as follows:

The body 10 is lowered into the well until the cutting edge 54 is opposite the brake between the casing sections connected by coupling 13′. During this lowering operation, the cutting edge 54 of the blade 20 rides over the inner surface of the casing 13. Furthermore, since the cutting edge 54 can only cut upon the upward movement of the blade 20, it is not necessary during the lowering operation of the device to cover the cutting edge with a tripping member such as the element 60 previously described.

In the construction shown in Figure 10 it is necessary to employ the friction plates 40 so as to hold the device up in the casing during the operation of the jar. By actuating the jar, it is possible to force the cutting tool upwardly, thus resulting in it ripping the upper casing section from the coupling 13, as indicated at 50.

Now, of course, it is to be understood that although I have illustrated and described in detail the preferred forms of my invention, the invention is not to be thus limited, but only in so far as defined by the scope and spirit of the appended claim.

I claim as my invention:

In combination, in a casing ripper, adapted to be lowered into a well casin, a body having an eccentrically disposed opening through which the piping in a well casing may extend, casing ripping means positioned to one side of the opening, and arranged to rip a casing sleeve free from its coupling without the necessity of disturbing said piping, and frictional means connected to said body on the side of said opening adjacent to and on the same side of the axis of the body as said ripping means and being arranged on both sides of said ripping means for holding said body in a given position during the ripping operation and for exerting a resulting force tending to urge the body in a direction toward the side of the casing opposite that which the ripping means is acting on.

In testimony whereof I have hereunto subscribed my name at Tulsa, Oklahoma, county of Tulsa.

FRANK J. HINDERLITER.